United States Patent
Asami et al.

(10) Patent No.: US 6,252,520 B1
(45) Date of Patent: Jun. 26, 2001

(54) MOBILE UNIT COMMUNICATION APPARATUS PROVIDING A RELAYED SIGNAL WHEN ERROR DETECTED

(75) Inventors: Ken Asami; Masashi Satomura; Hirotatsu Tsuchida, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/591,222

(22) Filed: Jun. 12, 2000

(30) Foreign Application Priority Data

Jun. 16, 1999 (JP) ................................................. 11-169919

(51) Int. Cl.[7] ...................................................... G08G 1/16
(52) U.S. Cl. .......................... 340/903; 340/435; 340/902; 340/933; 701/117
(58) Field of Search .................................... 340/903, 902, 340/435, 436, 944, 933, 935, 906; 701/117, 301

(56) References Cited

U.S. PATENT DOCUMENTS

| | | | | |
|---|---|---|---|---|
| 4,706,086 | * | 11/1987 | Panizza | 340/902 |
| 5,089,815 | * | 2/1992 | Potter et al. | 340/905 |
| 5,428,544 | * | 6/1995 | Shyu | 364/436 |
| 5,907,293 | * | 5/1999 | Tognazzini | 340/903 |
| 5,926,114 | * | 7/1999 | Andrews | 340/909 |
| 6,011,492 | * | 6/1998 | Garesche | 340/904 |
| 6,067,031 | * | 5/2000 | Janky et al. | 340/903 |
| 6,157,321 | * | 12/2000 | Ricci | 340/902 |

FOREIGN PATENT DOCUMENTS 5-266399    10/1993 (JP).

* cited by examiner

*Primary Examiner*—Jeffery Hofsass
*Assistant Examiner*—Phung Nguyen
(74) *Attorney, Agent, or Firm*—Arent Fox Kintner Plotkin & Kahn, PLLC (57) ABSTRACT

The object of the invention is to provide a mobile unit communication apparatus that can give required information of one other mobile unit to another other mobile unit which a radio signal from the one other mobile unit does not directly reach. To achieve the object, an incoming information signal is received, it is judged based upon an information signal incoming when the approach of another plural mobile units near a mobile unit is detected based upon the incoming information signal that an error occurs in communication between another plural mobile units and an information signal to be transmitted between another plural mobile units is relayed when an error in communication between another plural mobile units is detected.

11 Claims, 9 Drawing Sheets

MOBILE UNIT COMMUNICATION APPARATUS PROVIDING A RELAYED SIGNAL WHEN ERROR DETECTED

BACKGROUND OF THE INVENTION

1. Field of the Invention

The present invention relates to a mobile unit communication apparatus for communicating between mobile units such as a vehicle.

2. Description of the Related Art

A communication device for communicating between traveling vehicles and exchanging the information such as a traveling state of a vehicle is already disclosed in Japanese Patent Unexamined Publication No. Hei. 5-266399(JP-A-5-266399) for example. Such a conventional type communication device is provided with a radio communication device. The conventional type communication device transmits a radio signal including an information signal of an own vehicle by the radio communication device. Further, the conventional type communication device receives an information signal of another vehicle by the radio communication device, analyzes the received information signal of another vehicle and informs a driver and others of information required for the traveling of the own vehicle.

However, there is a case an obstacle such as the other vehicle exists between a vehicle transmitting an information signal and a vehicle receiving it because an information signal is transmitted as a radio signal. Thus, there is a problem that a radio signal is not received by the vehicle which should receive it even if the vehicle transmitting the information signal and the vehicle receiving it are near each other. Hence, the vehicle, which should receive it, continues traveling without acquiring required information of another vehicle.

The problem is caused not only in the case of a vehicle but in the case of a mobile unit such as a walker.

SUMMARY OF THE INVENTION

The object of the invention is to provide a mobile unit communication apparatus that can give required information of one of other mobile units to another other mobile unit which a radio signal from the one other mobile unit does not directly reach.

A mobile unit communication apparatus according to the invention is a mobile unit communication apparatus mounted in a mobile unit for transmitting and receiving an information signal. The mobile unit communication apparatus comprises: receiving means for receiving an incoming information signal; mobile unit approach detecting means for detecting the approach of another plural mobile units near a certain mobile unit based upon the incoming information signal received by the receiving means; communication error judging means for judging that an error occurs in communication between another plural mobile units based upon an incoming information signal received by the receiving means when approach is detected by the mobile unit approach detecting means; and transmitting means for relaying an information signal to be transmitted between another plural mobile units when an error is detected in communication between another plural mobile units occurs are provided.

An incoming information signal means an information signal transmitted from another mobile unit and received by the receiving means.

According to the invention, it is judged based upon an information signal incoming when the approach of another plural mobile units near a certain mobile unit is detected based upon an incoming information signal received by the receiving means that an error occurs in communication between another plural mobile units. Further, an information signal to be transmitted between another plural mobile units is relayed when an error is detected in communication between another plural mobile units. Hence precious information of one mobile unit can be given to another mobile unit which a radio signal from one mobile unit of another plural mobile units mutually approaching does not directly reach.

DETAILED DESCRIPTION OF THE PREFERED EMBODIMENT

Referring to the drawings, an embodiment of the invention will be described in detail below.

Figure 1:
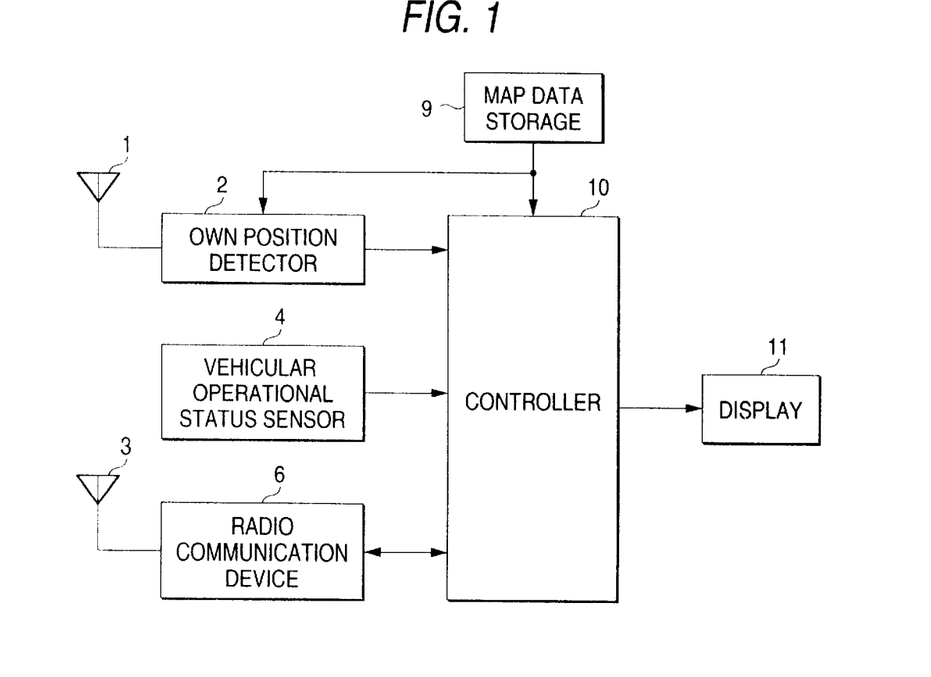
FIG. 1 is a block diagram showing an inter-vehicle radio communication device according to the invention.

FIG. 1 shows an inter-vehicle radio communication device according to the invention. The inter-vehicle communication device is mounted in a vehicle not shown and is provided with an own position detector 2 as an information detector, a vehicular operational status sensor 4 and a radio communication device 6.

The own position detector 2 is equivalent to a global positioning system (GPS) connected to a GPS antenna 1. The own position detector 2 receives a radiowave transmitted from an artificial satellite via the GPS antenna 1, operates and outputs own position information including the current own position and traveling azimuth based upon the received signal. Also, in the operation, own position information is corrected using map data stored in a map data storage 9.

The vehicular operational status sensor 4 is provided with a speed sensor for detecting the speed of a vehicle, an acceleration sensor for detecting the acceleration of the vehicle, a brake switch for detecting the operation of a brake, a direction indicator switch for detecting the operation of a direction indicator of the vehicle, an inter-vehicle distance sensor for measuring distance between the own vehicle and each vehicle traveling before and after the own vehicle, that is, inter-vehicle distance by a laser beam or a radiowave, an obstacle sensor for detecting an obstacle in front of the own vehicle by a camera, infrared radiation or a supersonic wave and measuring distance to the obstacle, a steering sensor for detecting the quantity of steering, a yaw rate sensor for detecting the change of the azimuth of the vehicle, a shift position sensor for detecting a shift position of a transmission mounted in the vehicle and a throttle aperture sensor for detecting the aperture of a throttle valve of the vehicle though they are not shown in FIG. 1. Also, the obstacle sensor and the inter-vehicle distance sensor can mutually interpolate.

Figure 2:
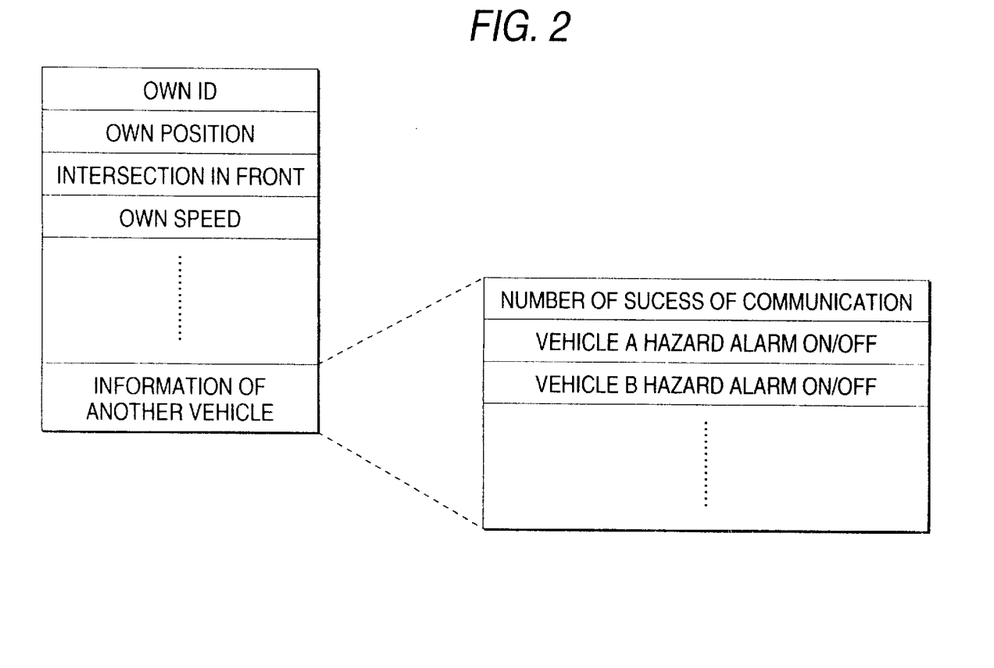
FIG. 2 shows the data format of an information signal.

The radio communication device 6 is provided to communicate with another vehicle and transmits/receives a radio signal via an antenna 3. An information signal received by the radio communication device 6 is equivalent to an incoming information signal. The contents of an information signal carried by a radio signal are status data including the information of the own vehicle. For example, the status data are own ID(ID of an own mobile unit), the current own position, an intersection (the position and the number) in the front on a road, own speed, own acceleration, a traveling azimuth, the course of a turn signal, time of arrival at the intersection, the number of success of communication with another vehicles and whether a hazard alarm to another vehicle is turned on or not (hazard alarm data). For a data format of an information signal, as shown in FIG. 2, each data such as an own position, an intersection in the front on a road and own speed is arrayed with own ID in the head. Also, in case communication with another vehicle is performed, the number of success of the communication and whether a hazard alarm to another vehicle is turned on or not are added. It means a hazardous state that vehicles mutually approach that a hazard alarm is turned on.

A controller 10 is connected to the own position detector 2, the vehicular operational status sensor 4 and the radio communication device 6. The controller 10 is composed of microcomputers and executes control operation described later. A display 11 is connected to the controller 10. The display 11 is provided to inform a driver and a fellow passenger in a vehicle of an own status and the status of another vehicle, displays the statuses according to an instruction to display from the controller 10 and informs by voice or a warning sound via a speaker.

The radio communication device 6 is equivalent to receiving means and the transmitting means, and the controller 10 is equivalent to the mobile unit approach detecting means and the communication error judging means.

Next, referring to a flowchart shown in FIG. 3, the control operation of the controller 10 will be described. The control operation is repeatedly executed every predetermined time, for example 100 millisecond.

Figure 3:
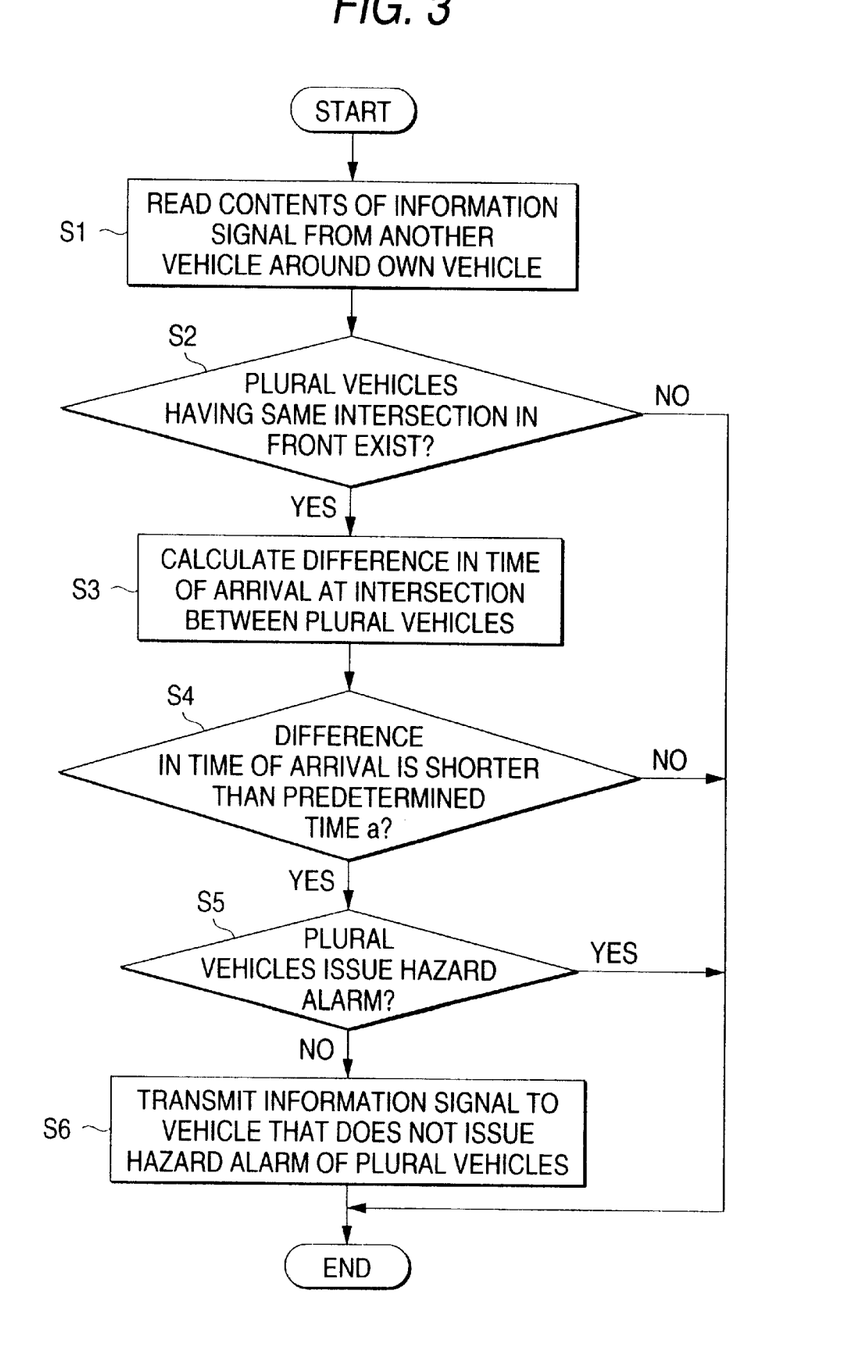
FIG. 3 is a flowchart showing the control operation of a controller shown in FIG. 1.

As shown in FIG. 3, the controller 10 first reads the data contents of an information signal from another vehicle around the own vehicle received by the radio communication device 6 (a step SI). Next, the controller 10 determines whether plural vehicles approaching the same intersection as an intersection in the front included as data in the information signal exist or not (a step S2). In case plural vehicles approaching the same intersection as the intersection in the front on a road in the information signal received from another vehicle exist, the controller calculates difference in time of arrival at the intersection between each of the plural vehicles (a step S3). As time of arrival at the intersection of another vehicle is included in an information signal from another vehicle received by the radio communication device 6, difference between each time of arrival is difference in time of arrival. When the controller calculates difference in time of arrival, it determines whether vehicles the difference in time of arrival between which is smaller than predetermined time "a" exist or not (a step S4). In case vehicles the difference in time of arrival between which is smaller than predetermined time a exist, the controller determines whether the vehicles issue a hazard alarm to each other or not (a step S5). In case another vehicle approaching a vehicle as described above exists, a hazard alarm specifying another vehicle is turned on and it is written to an information signal to be transmitted that the hazard alarm is turned on. Therefore, in case it is not written to an information signal from one or both of vehicles the existence of which is determined in the step S4 that such a hazard alarm is turned on (that is, a hazard alarm is kept turned off) , the controller 10 considers that communication between the vehicles fails. Further the controller 10 generates an information signal showing the existence of the vehicles approaching the intersection in the front and being hazardous and instructs the radio communication device 6 to transmit the information signal to a vehicle to which a hazard alarm is not turned on (a step S6).

Figure 4:
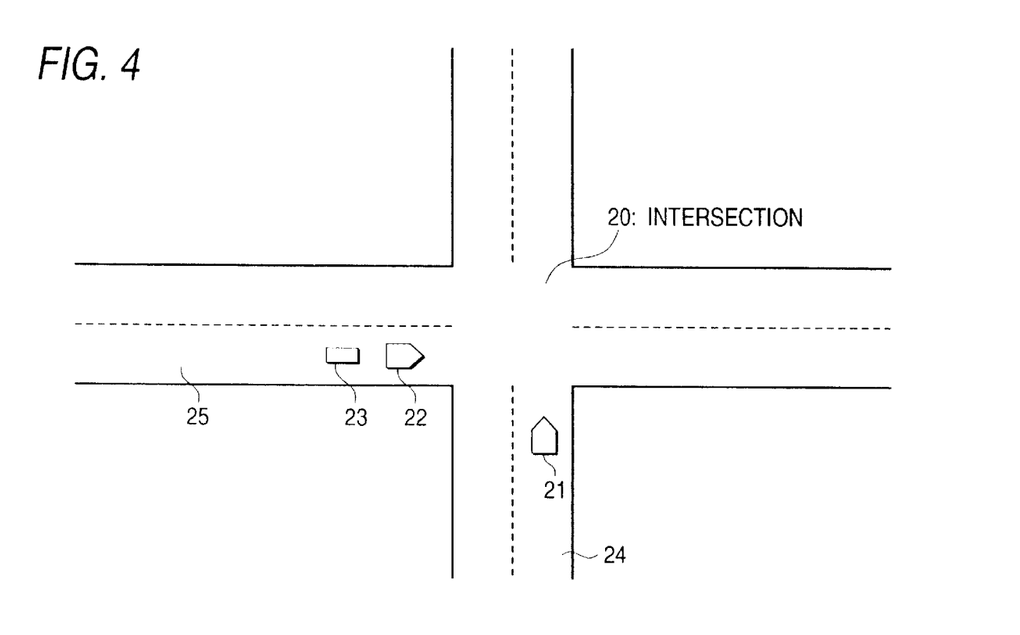
FIG. 4 is an explanatory drawing for explaining the control operation shown in FIG. 3 corresponding to traveling vehicles.

For example, as shown in FIG. 4, suppose that vehicles 21 to 23 traveling toward an intersection 20 exist and the vehicles 21 to 23 mount the inter-vehicle radio communication device. The vehicle 21 is going to travel straight on a road 24 across the intersection 20 and the vehicle 22 also travels straight toward the intersection 20 from the left side of the vehicle 21 on a road 25 crossing the road 24. The vehicle 23 is a motor-cycle and travels straight toward the intersection 20 after the vehicle 22. However, the intersection 20 is not open and an information signal transmitted as a radio signal is not suitably received between the vehicles 21 and 23 behind the vehicle 22 and the existence of each other may not be identified. Then, the control operation described above is executed by the controller 10 of the inter-vehicle radio communication device of the vehicle 22. That is, it is judged in the step S4 that difference in time of arrival at the intersection 20 between the vehicles 21 and 23 is smaller than predetermined time a. Next, it is determined whether each of the vehicles 21 and 23 issues a hazard alarm to each other or not at the step S5. In case no hazard alarm is issued to both of vehicles 21 and 23, an information signal showing the existence of a vehicle approaching and being hazardous (the vehicle 23 for the vehicle 21 and the vehicle 21 for the vehicle 23) is transmitted from the vehicle 22 to the vehicles 21 and 23. Also, in case a hazard alarm is not issued to either of the vehicle 21 or 23, an information signal showing the existence of an approaching vehicle (the vehicle 21 or 23) is transmitted from the vehicle 22 to either.

Figure 5:
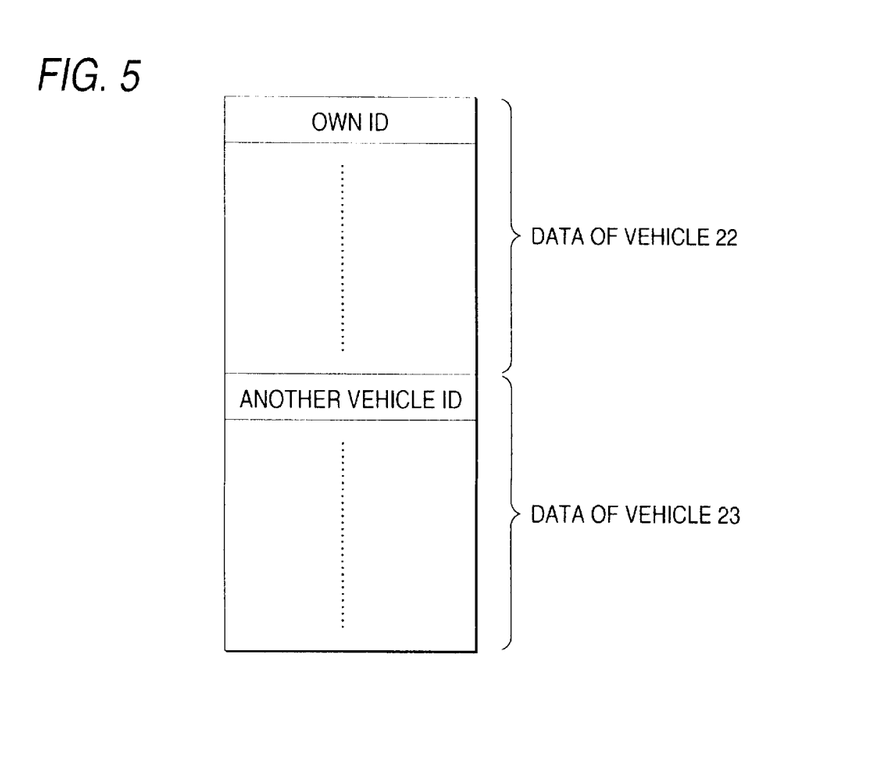
FIG. 5 shows the data format of an information signal transmitted from a vehicle 22 to a vehicle 23.
Figure 6:
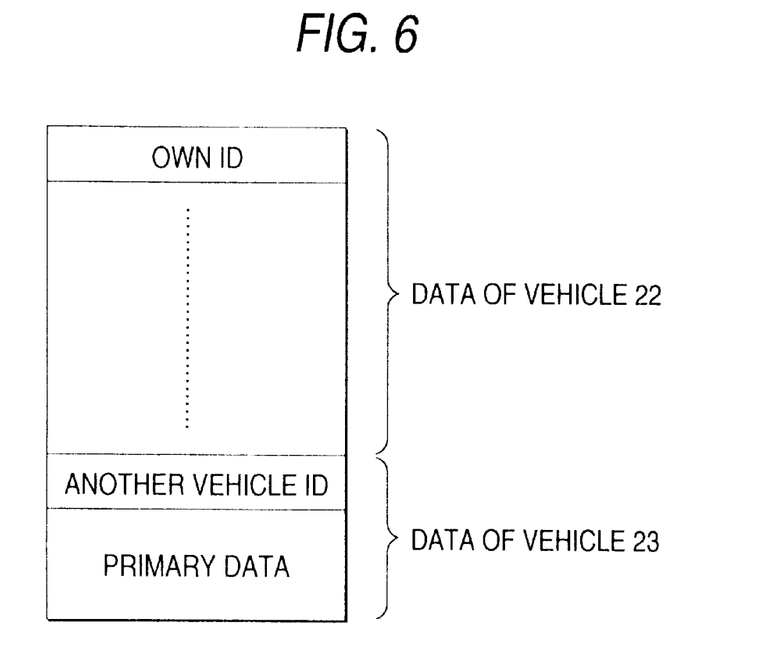
FIG. 6 shows the data format of an information signal transmitted from the vehicle 22 to the vehicle 23.
Figure 7:
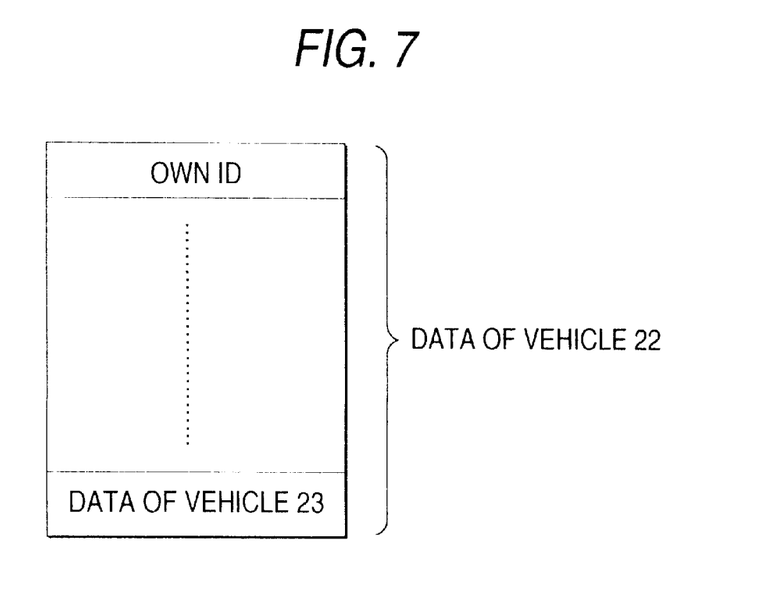
FIG. 7 shows the data format of an information signal transmitted from the vehicle 22 to the vehicle 23.

In case an information signal is transmitted to the vehicle 21 for example by the operation in the step S6, the information signal may be also acquired by adding the data of an information signal transmitted from the vehicle 23 to the data of the vehicle 22 as shown in FIG. 5. The information signal may be also acquired by adding only primary data such as an own position and an azimuth in the information signal transmitted from the vehicle 23 to the data of the vehicle 22 as shown in FIG. 6. Further, as shown in FIG. 7, the primary data such as an own position and an azimuth of the vehicle 23 may be also included in the data of the vehicle 22.

The control operation by the controller 10 shown in FIG. 3 is operation in case plural vehicles mutually approach an intersection, however, control operation in case plural vehicles traveling to the same traveling azimuth mutually approach to change a lane will be described below.

Figure 8:
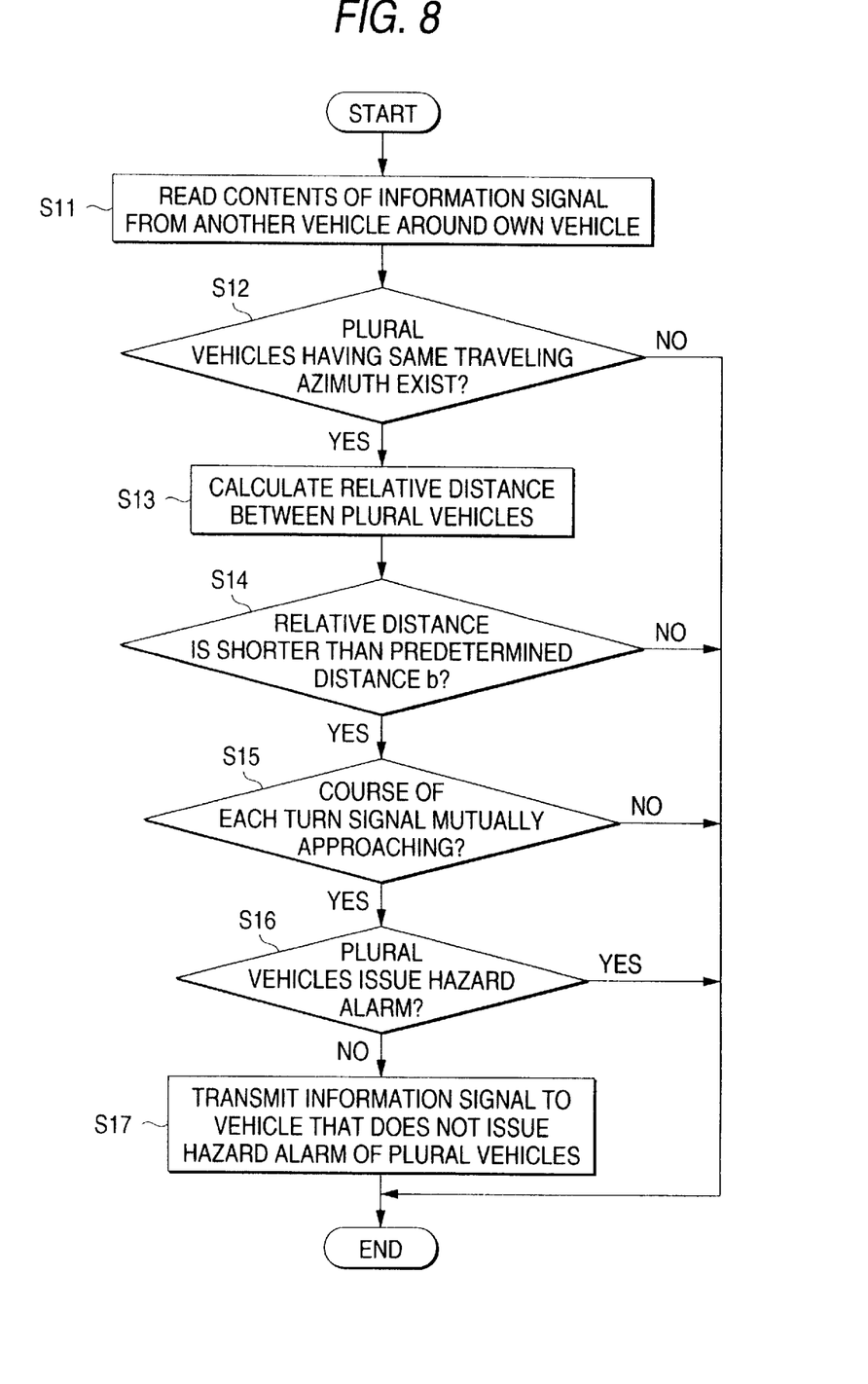
FIG. 8 is a flowchart showing the control operation of the controller shown in FIG. 1.

The controller 10 first reads the data contents of an information signal received by the radio communication device 6 from another vehicle around the own vehicle (a step S11) as shown in FIG. 8. The controller 10 determines whether plural vehicles the traveling azimuth of which is the same as a traveling azimuth included in the information signal exist or not (a step S12). In case plural vehicles the traveling azimuth of which is the same as a traveling azimuth included in an information signal from another vehicle exist, the controller calculates relative distance between the plural vehicles (a step S13). The position (the longitude and the latitude) of another vehicle is included in an information signal from another vehicle received by the radio communication device 6. Hence, the controller calculates relative distance between plural vehicles using the position of another vehicle based upon the position of the own vehicle acquired from the own position detector 2. When the controller calculates the relative distance, it determines whether vehicles mutually having relative distance which is shorter than predetermined distance "b" exist or not (a step S14). In case vehicles mutually having the relative distance which is shorter than the predetermined distance b exist, the controller further determines whether the course of a turn signal of each vehicle shows a direction mutually close or not (a step S15). In case the course of the turn signal shows the direction mutually close, the controller determines whether each vehicle issues a hazard alarm to each other or not (a step S16). In case another vehicle approaching a vehicle exists, a hazard alarm specifying another vehicle is turned on and an information signal showing that the hazard alarm is turned on is also transmitted. Therefore, in case it is not written to an information signal from one or both of the vehicles the existence of which is determined in the step S14 that the hazard alarm is turned on, an information signal showing the existence of vehicles approaching to change a lane is generated and is transmitted to a vehicle not showing that a hazard alarm is turned on by the radio communication device 6 (a step S17).

Figure 9:
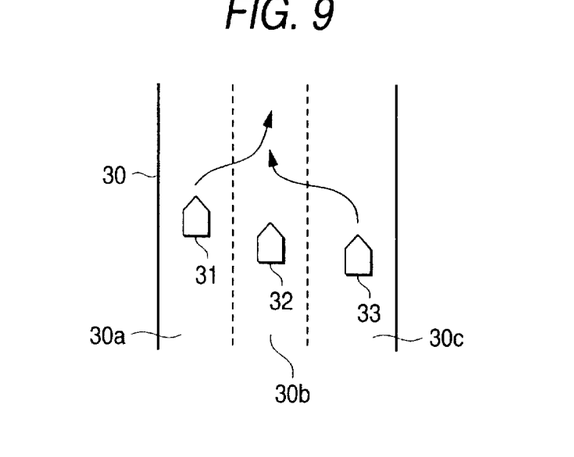
FIG. 9 is an explanatory drawing for explaining the control operation shown in FIG. 8 corresponding to traveling vehicles.

For example, as shown in FIG. 9, suppose that vehicles 31 to 33 traveling on each lane of a road 30 having three lanes per one way exist and these vehicles 31 to 33 mount the inter-vehicle radio communication device. The vehicle 32 is traveling only on a central lane 30b. However, the vehicle 31 travels on a left lane 30a, then is accelerated and tries to change a lane to the central lane 30b as shown by an arrow. On the other hand, the vehicle 33 travels on a right lane 30c, then is accelerated and tries to change a lane to the central lane 30b as shown by an arrow. When the vehicles 31 to 33 travel approximately in parallel as shown in FIG. 9, an information signal transmitted as a radio signal is not suitably received between the vehicles 31 and 33 behind the vehicle 32. Further, the vehicles 31 and 33 may not identify the existence of each other. The control operation shown in FIG. 8 is executed by the controller 10 of the inter-vehicle radio communication device of the vehicle 32. That is, it is judged in the step S14 that relative distance between the vehicles 31 and 33 is shorter than predetermined distance b. Next, it is determined in the step S15 that the course of each turn signal of the vehicles 31 and 33 shows a direction mutually approaching, processing proceeds to the step S16. Further, it is determined whether each of the vehicles 31 and 33 issues a hazard alarm to each other or not. Therefore, in case no hazard alarm is issued to both vehicles 31 and 33, an information signal showing the existence of vehicles (the vehicle 33 for the vehicle 31 and the vehicle 31 for the vehicle 33) that may further mutually approach when they further change a lane is transmitted from the vehicle 32 to the vehicles 31 and 33. Also, in case a hazard alarm is not issued in either of the vehicle 31 or 33, an information signal showing the existence of a vehicle (the vehicle 31 or 33) that may further approach by the change of a lane is transmitted from the vehicle 32 to either vehicle.

Next, control operation in case there is a vehicle turning to the left on a general road and the vehicle may approach another vehicle will be described.

Figure 10:
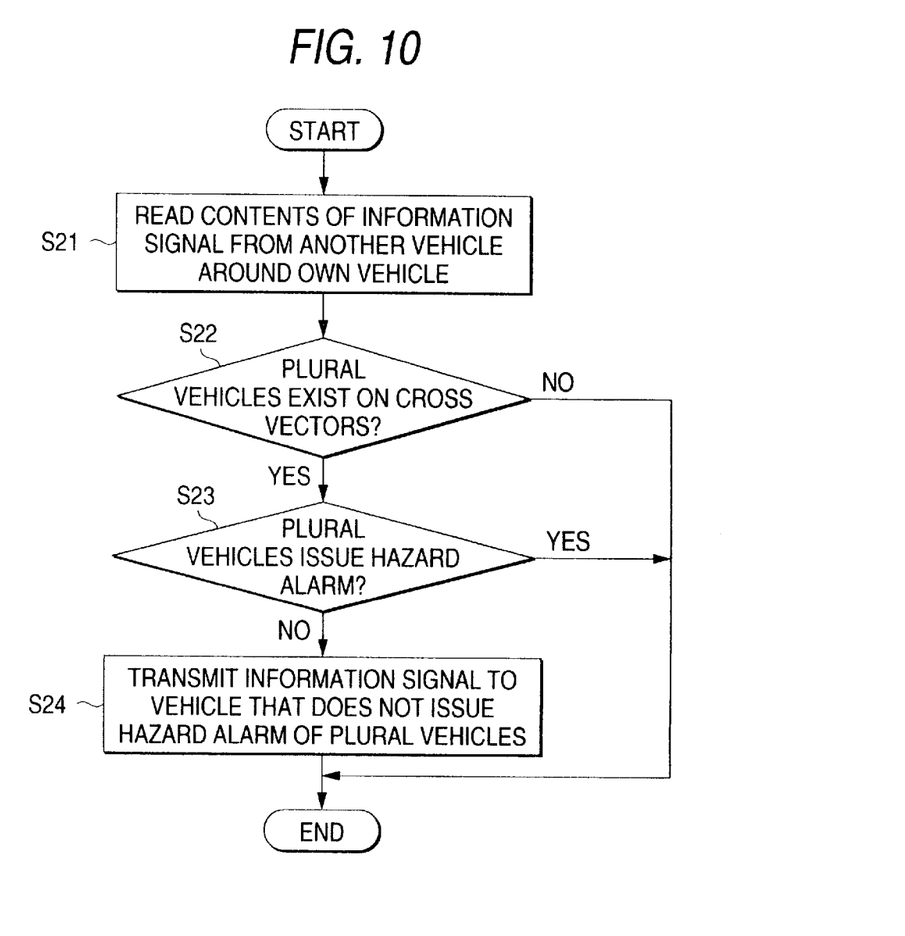
FIG. 10 is a flowchart showing the control operation of the controller shown in FIG. 1.

The controller 10 first reads the data contents of an information signal from another vehicle around the own vehicle received by the radio communication device 6 (a step S21) as shown in FIG. 10. Vectors are formed based upon each data such as a traveling azimuth, a turn signal and vehicle speed included in the information signal. Each of vehicles has the vector. The controller 10 determines whether or not plural vehicles whose vectors are crossing (a step S22) exist. In case plural vehicles whose vectors are crossing exist, the controller determines whether each vehicle issues a hazard alarm to each other or not (a step S23). In case another vehicle approaching a vehicle exists, a hazard alarm specifying another vehicle is turned on and it is also written to an information signal to be transmitted that the hazard alarm is turned on. Therefore, in case it is not written to an information signal from one or both of vehicles the existence of which is determined in the step S22 that such a hazard alarm is turned on, the controller considers that communication between the vehicles fails. Subsequently, the controller 10 generates an information signal showing the existence of vehicles approaching from cross directions and the information signal is transmitted to the vehicle not showing that the hazard alarm is turned on by the radio communication device 6 (a step S24).

Figure 11:
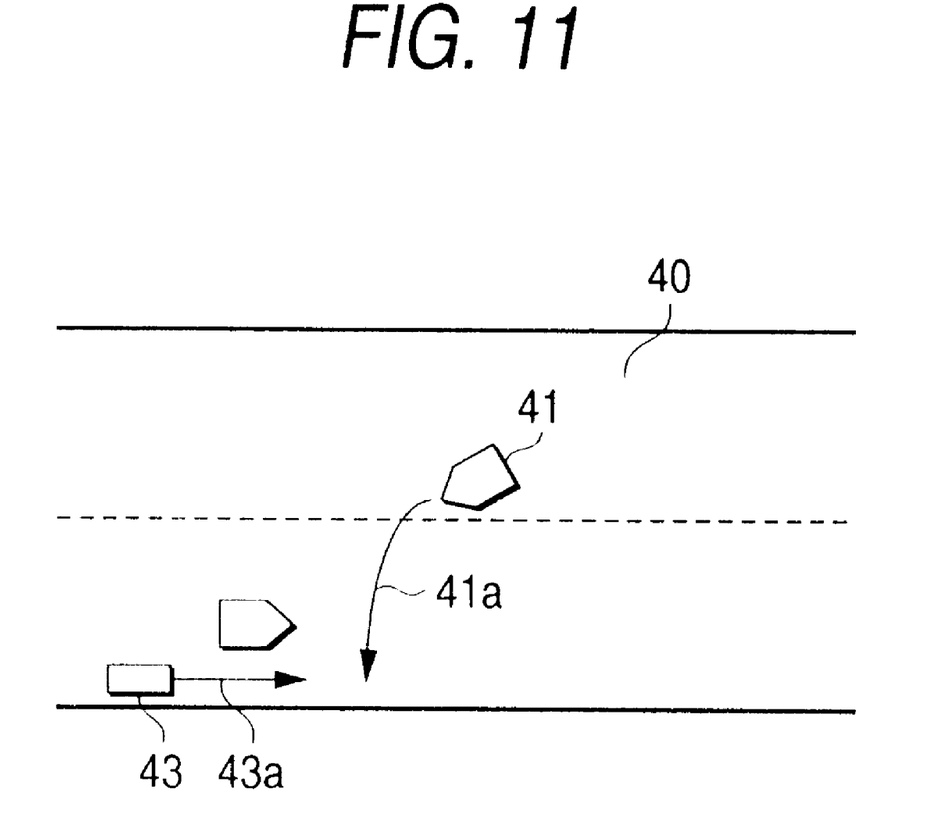
FIG. 11 is an explanatory drawing for explaining the control operation shown in FIG. 10 corresponding to traveling vehicles.

As shown in FIG. 11, a vehicle 41 approaching from an opposite lane tries to turn to the left in a direction shown by an arrow 41a in front of a vehicle 42 traveling at low speed on a road 40. Then, a vehicle 43 of a motor-cycle travels straight after the vehicle 42 at relatively high speed and tries to overtake the vehicle 42 as shown by an arrow 43a. These vehicles 41 to 43 mount the inter-vehicle radio communication device. However, an information signal transmitted as a radio signal is not suitably received between the vehicles 41 and 43 behind the vehicle 42 and the existence of each other may not be identified. When the control operation shown in FIG. 10 is executed by the controller 10 of the inter-vehicle radio communication device of the vehicle 42, it is judged in the step S22 that the vectors of the vehicles 41 and 42 may cross. Next, it is determined whether the vehicles 41 and 43 issue a hazard alarm to each other or not at the step S23. In case no hazard alarm is issued to both of the vehicles 41 and 43, an information signal showing the existence of each vehicle approaching to turn to the left or travel straight (the vehicle 43 for the vehicle 41 and the vehicle 41 for the vehicle 43) is transmitted from the vehicle 42 to the vehicles 41 and 43. Also, in case a hazard alarm is not issued to either of the vehicle 41 or 43, an information signal showing the existence of the vehicle (the vehicle 41 or 43) approaching either vehicle is transmitted from the vehicle 42.

For a mobile unit, as described above, not only a vehicle but a walker are included. In case a walker holds a mobile unit communication apparatus and transmits an information signal showing a position where the walker exists from the mobile unit communication apparatus, the existence of the walker can be known when the information signal is received by the radio communication device 6. As described above, the control operation of the controller 10 in consideration of the existence of the walker will be described below.

Figure 12:
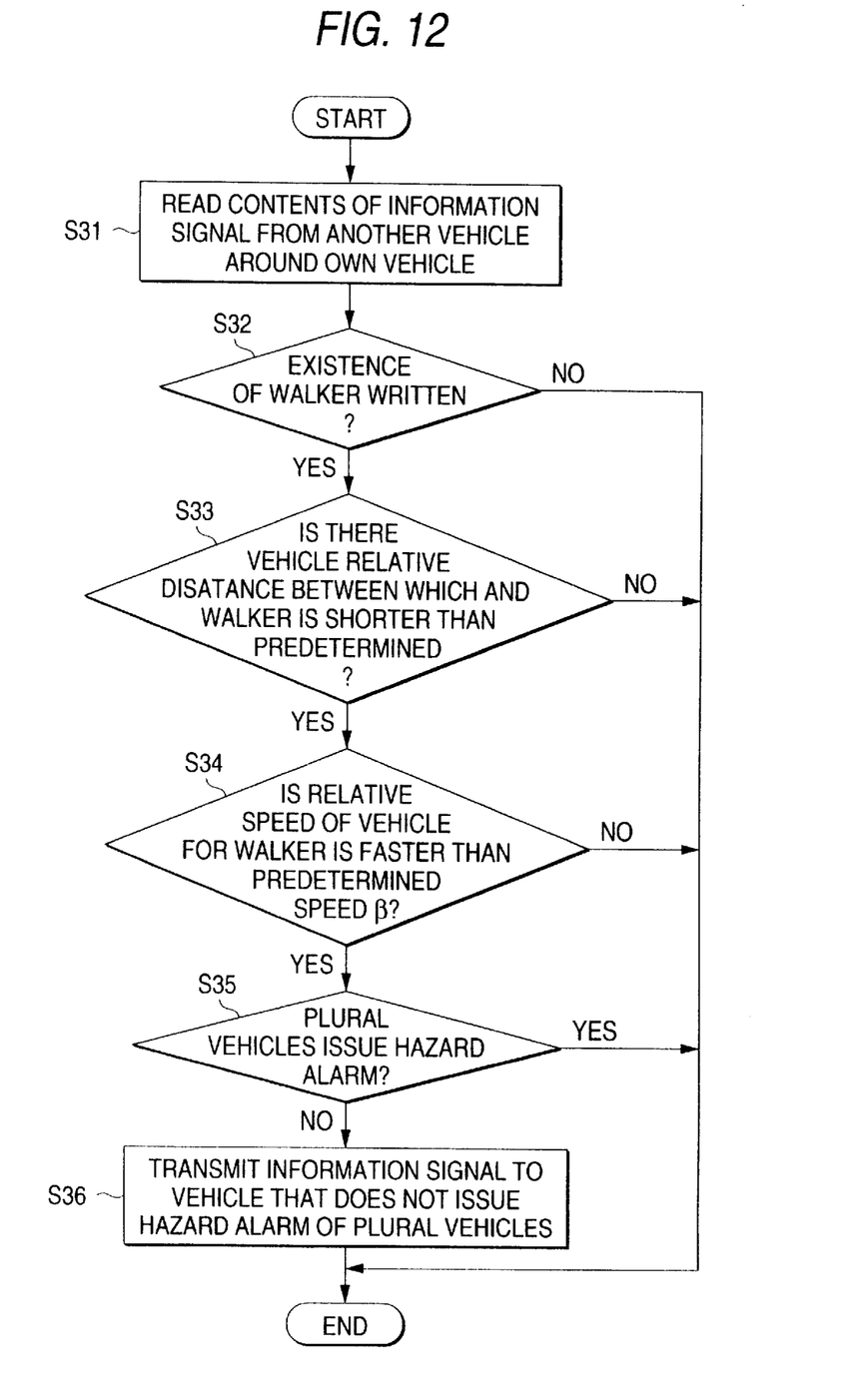
FIG. 12 is a flowchart showing the control operation of the controller shown in FIG. 1.

The controller 10 first reads the data contents of an information signal received by the radio communication device 6 from a vehicle around the own vehicle (a step S31) as shown in FIG. 12. The controller 10 determines whether an information signal showing the existence of a walker exists or not (a step S32). The controller determines whether a vehicle showing the position of the vehicle such as relative distance from a position in which the walker exists is shorter than predetermined distance α exists or not (a step S33). In case the vehicle exists, the controller determines whether the relative speed of the vehicle for the walker is faster than predetermined speed β or not (a step S34). As hazardousness for the walker is high in case the relative speed is faster than the predetermined speed β, the controller determines whether the vehicle issues a hazard alarm to the walker or not (a step S35). In case a walker approaching a vehicle exists, a hazard alarm specifying another vehicle is turned on and it is written to an information signal to be transmitted that the hazard alarm is turned on. Therefore, in case it is not written to an information signal from the vehicle the existence of which is determined in the step S33 that such a hazard alarm is turned on, the controller considers that communication between the vehicle and the walker fails. Subsequently, the controller 10 generates an information signal showing that the vehicle is approaching the walker and instructs the vehicle to transmit an information signal to the radio communication device 6 (a step S36).

Figure 13:
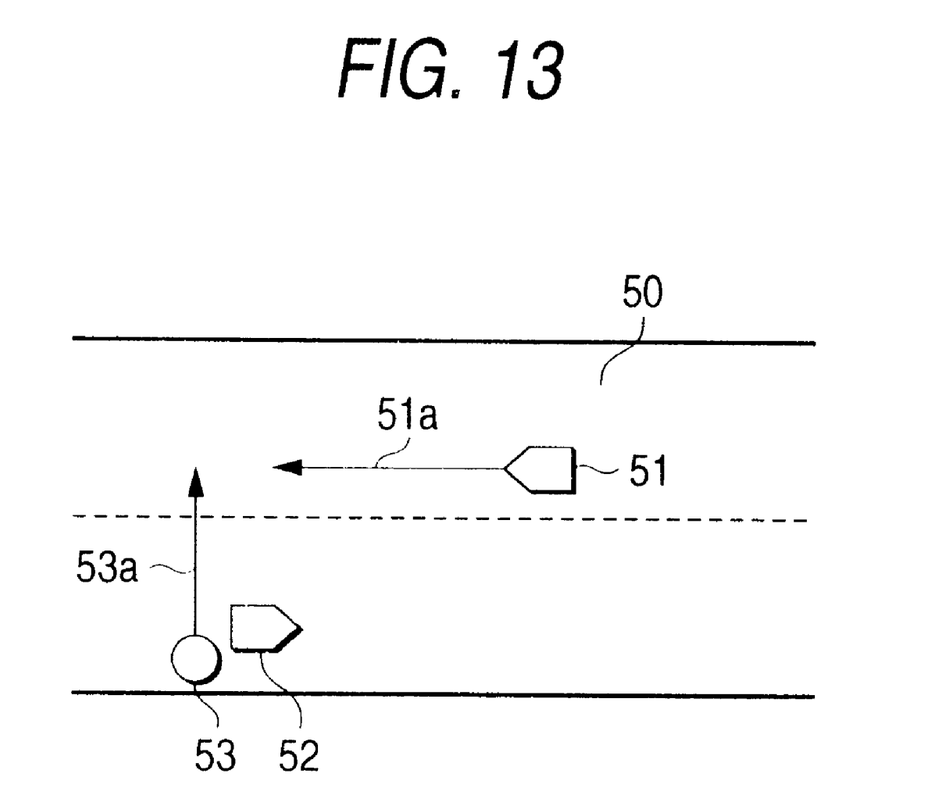
FIG. 13 is an explanatory drawing for explaining the control operation shown in FIG. 12 corresponding to traveling vehicles and a walker.

As shown in FIG. 13, vehicles 51 and 52 traveling on a road 50 with them mutually opposite exist and a walker 53 tries to cross the road 50 at the back of the vehicle 52. That is, the vehicle 51 travels in a direction shown by an arrow 51a and the walker 53 at the back of the vehicle 52 is crossing in a direction shown by an arrow 53a. Suppose that the vehicles 51 and 52 mount the inter-vehicle radio communication device and the walker 53 has a mobile unit communication apparatus that can transmit and receive an information signal to/from the inter-vehicle radio communication device. However, an information signal transmitted as a radio signal is not suitably received between the vehicle 51 and the walker 53 behind the vehicle 52 and they may not identify the existence of each other. When the control operation shown in FIG. 12 is executed by the controller 10 of the inter-vehicle radio communication device of the vehicle 52, it is judged in the step S33 that relative distance between the vehicle 51 and the walker 53 is shorter than predetermined distance α. Next, it is also judged in the step S34 that relative speed is faster than predetermined speed β, processing proceeds to the step S35 and it is determined that the vehicle 51 issues a hazard alarm to the walker 53 or not. In case the vehicle 51 issues no hazard alarm, an information signal showing that the vehicle 51 is approaching the walker 53 is transmitted from the vehicle 52. In case the walker 53 does not sense that he/she is approaching the vehicle 51, an information signal may be also transmitted to the walker 53 from the vehicle 52.

For the judgment that a hazard alarm is to be turned on in each vehicle, when relative distance between an own position acquired from the own position detector 2 and the position of another vehicle acquired from the received information signal is shorter than predetermined distance a, a hazard alarm is turned on. Also, when a hazard alarm is not turned on in case plural vehicles mutually approach and a hazard alarm is to be turned on, it is judged that an error occurs in communication between plural vehicles.

As described above, according to the invention, it is judged based upon an information signal from another mobile unit when the approach of another plural mobile units near a mobile unit is detected based upon the received information signal from another mobile unit that an error occurs in communication between another plural mobile units near the mobile unit. Further, an information signal to be transmitted between another plural mobile units is relayed when an error in communication between another plural mobile units is detected. Accordingly, precious information of one other mobile unit can be given to another other mobile unit which a radio signal from the one other mobile unit of another plural mobile units mutually approaching does not directly reach. Further, a hazard by the approach of traveling plural mobile units such as a vehicle can be avoided.

What is claimed is:

1. A mobile unit communication apparatus mounted in a mobile unit for transmitting and receiving an information signal, comprising:

receiving means for receiving an incoming information signal;

mobile unit approach detecting means for detecting approach of other mobile units near an own mobile unit based upon said incoming information signal received by said receiving means;

communication error judging means for judging that an error occurs in communication between said other mobile units based upon said incoming information signal received by said receiving means when approach is detected by said mobile unit approach detecting means; and transmitting means for relaying the information signal to be transmitted between said other mobile units when the error is detected in communication between said other mobile units.

2. The mobile unit communication apparatus according to claim 1, wherein said information signal includes hazard alarm data showing whether a distance between said other mobile units is shorter than predetermined distance or not, and said communication error judging means judges that an error occurs in communication between said other mobile units based upon the contents of said hazard alarm data in said incoming information signal.

3. The mobile unit communication apparatus according to claim 1, wherein said other mobile units detected by said mobile unit approach detecting means are vehicles mutually approaching the same intersection.

4. The mobile unit communication apparatus according to claim 1, wherein said other mobile units detected by said mobile unit approach detecting means are vehicles mutually changing each lane and approaching.

5. The mobile unit communication apparatus according to claim 1, wherein said other mobile units detected by said mobile unit approach detecting means are a vehicle turning to the left and a vehicle approaching the vehicle.

6. The mobile unit communication apparatus according to claim 1, wherein said other mobile units detected by said mobile unit approach detecting means are a walker crossing a road and a vehicle approaching the walker.

7. The mobile unit communication apparatus according to claim 3, wherein said mobile unit approach detecting means comprises:

(1) determining means for determining whether or not other vehicles approaching the same intersection exist, the intersection being defined as an intersection in front of the traveling azimuth of own vehicle;

(2) calculating means for calculating difference in time of arrival at the intersection between each of said other vehicles when said other vehicles approaching the same intersection exist; and (3) determining means for judging whether or not vehicles the difference in time of arrival between which is smaller than predetermined time exist, and said communication error judging means comprises (4) determining means for judging whether or not said vehicles issue a hazard alarm to each other when vehicles the difference in time of arrival between which is smaller than predetermined time exist.

8. The mobile unit communication apparatus according to claim 4, wherein said mobile unit approach detecting means comprises:

(1) determining means for determining whether or not other vehicles the traveling azimuth of which is the same as a traveling azimuth included in said information signal exist;

(2) calculating means for calculating relative distance between said other vehicles when plural vehicles the traveling azimuth of which is the same as a traveling azimuth included in said information signal exist;

(3) determining means for determining whether or not vehicles said relative distance between which is shorter than predetermined distance exist; and (4) determining means for determining whether or not a course of a turn signal of each vehicle shows a direction mutually close when said vehicles said relative distance between which is shorter than predetermined distance exist, and said communication error judging means comprises (5) determining means for determining whether or not each vehicle issues hazard alarm to each other when the course of the turn signal of each vehicle shows a direction mutually close.

9. The mobile unit communication apparatus according to claim 5, wherein said mobile unit approach detecting means comprises (1) determining means for determining whether or not other vehicles whose vectors are crossing exist, said vector being formed base on data included in said information signal, and said communication error judging means comprises (2) determining means for determining whether or not each vehicle issues a hazard alarm to each other when said other vehicles whose vectors are crossing.

10. The mobile unit communication apparatus according to claim 6, wherein said mobile unit approach detecting means comprises: (1) determining means for determining whether or not said information signal shows an existence of a walker exists;

(2) determining means for determining whether or not a vehicle showing a position of said vehicle such as relative distance from a position of said walker, said relative distance being shorter than predetermined distance; and (3) determining means for determining whether or not a relative speed of said vehicle for said walker is faster than predetermined speed when said vehicle exists, and said communication error judging means comprises (4) determining means for determining whether or not said vehicle issues a hazard alarm to said walker when said relative speed is faster than said predetermined speed.

11. A method of communication for mobile unit, comprising a step of:

(1) receiving an incoming information signal;

(2) detecting an approach of other mobile units based upon said incoming information signal;

(3) judging an error occurred in communication between said other mobile units according to the approach based upon said incoming information signal; and (4) transmitting an information signal, wherein said step of transmitting comprises a step of relaying the information signal to be transmitted between said other mobile units when the error is detected in communication between said other mobile units.

* * * * *